US010085092B2

United States Patent
Falk et al.

(10) Patent No.: US 10,085,092 B2
(45) Date of Patent: Sep. 25, 2018

(54) FLASH HEAD AND EXTENSION CABLE WITH IDENTIFICATION ELECTRONICS AND A FLASH GENERATOR

(71) Applicant: PROFOTO AB, Sundbyberg (SE)

(72) Inventors: Anton Falk, Huddinge (SE); Ulf Carlsson, Täby (SE)

(73) Assignee: PROFOTO AB, Sundbyberg (SE)

( * ) Notice: Subject to any disclaimer, the term of this patent is extended or adjusted under 35 U.S.C. 154(b) by 0 days.

(21) Appl. No.: 15/555,229

(22) PCT Filed: Feb. 25, 2016

(86) PCT No.: PCT/SE2016/050143
§ 371 (c)(1),
(2) Date: Sep. 1, 2017

(87) PCT Pub. No.: WO2016/140611
PCT Pub. Date: Sep. 9, 2016

(65) Prior Publication Data
US 2018/0109877 A1    Apr. 19, 2018

(30) Foreign Application Priority Data

Mar. 2, 2015 (SE) ...................... 1550241

(51) Int. Cl.
*G03B 15/02* (2006.01)
*H05B 41/32* (2006.01)
(Continued)

(52) U.S. Cl.
CPC ............... *H04R 5/04* (2013.01); *G03B 15/02* (2013.01); *H04M 1/6058* (2013.01); *H04M 1/72527* (2013.01); *H05B 41/32* (2013.01)

(58) Field of Classification Search
None
See application file for complete search history.

(56) References Cited

U.S. PATENT DOCUMENTS 2,358,796 A * 9/1944 Edgerton ............... G03B 15/05
                                                    315/175
5,146,250 A * 9/1992 Sakamoto ............. H05B 41/32
                                                    315/241 P
(Continued)

FOREIGN PATENT DOCUMENTS

WO    WO 2006/045617    5/2006

OTHER PUBLICATIONS

International Search Report in PCT Application No. PCT/SE2016/050143, dated Jun. 30, 2016 in 4 pages.
(Continued)

*Primary Examiner* — W B Perkey
(74) *Attorney, Agent, or Firm* — Knobbe, Martens, Olson & Bear, LLP

(57) ABSTRACT

A flash generator is capable of identifying which type of flash head and flash head extension cables that is connected to the flash generator. A flash head and flash head extension cable can be identified by the flash generator. The flash generator provides a power supply to a flash head. Further the flash generator includes a first current generator for charging the capacitor. The flash generator further includes a second current generator or a voltage generator connected to an output of the flash generator and arranged to provide a current or a voltage to create a voltage $U_{ID}$ over a component in a flash head or a flash head extension cable connected to the flash generator. Processing means are arranged to identify the flash head or the flash head extension cable by the measured voltage $U_{ID}$.

20 Claims, 2 Drawing Sheets

(51) Int. Cl.
    *H04R 5/04*     (2006.01)
    *H04M 1/725*     (2006.01)
    *H04M 1/60*     (2006.01)

(56) References Cited

U.S. PATENT DOCUMENTS

| | | | |
|---|---|---|---|
| 6,069,960 A | 5/2000 | Mizukami et al. | |
| 9,395,606 B1* | 7/2016 | Harris | G03B 15/05 |
| 2009/0289567 A1* | 11/2009 | Kobayashi | H05B 41/32 |
| | | | 315/241 R |
| 2010/0226638 A1* | 9/2010 | Briese | G03B 15/05 |
| | | | 396/155 |
| 2015/0355525 A1* | 12/2015 | Abrams | G03B 15/02 |
| | | | 348/207.11 |
| 2017/0201666 A1* | 7/2017 | Clark | H04N 5/04 |
| 2017/0293204 A1* | 10/2017 | Clark | G03B 15/05 |
| 2018/0109877 A1* | 4/2018 | Falk | H04R 5/04 |

OTHER PUBLICATIONS

International Written Opinion in PCT Application No. PCT/SE2016/050143, dated Jul. 1, 2016 in 5 pages.

* cited by examiner

FLASH HEAD AND EXTENSION CABLE WITH IDENTIFICATION ELECTRONICS AND A FLASH GENERATOR

CROSS-REFERENCE TO RELATED APPLICATIONS

This application is the U.S. National Phase under 35 U.S.C. § 371 of International Application No. PCT/SE2016/050143, filed Feb. 25, 2016, titled A FLASH HEAD AND EXTENSION CABLE WITH IDENTIFICATION ELECTRONICS AND A FLASH GENERATOR, which claims priority to SE Patent Application No. 1550241-2, filed Mar. 2, 2015, the entirety of each of which is hereby expressly incorporated by reference herein.

TECHNICAL FIELD

The present disclosure relates to a flash head, a flash head extension cable for a flash head. The disclosure also relates to a flash generator of providing a power supply to a lamp head.

BACKGROUND

Flash generators employ a capacitor bank for storing an amount of energy which can be discharged through a flash tube so as to generate a discharge and a flash light. During the discharge, plasma is formed inside the flash tube where the character of the plasma also determines the character of the flash light. A flash tube is dimensioned, as far as is possible, to give optimal light characteristics throughout its entire dynamic range. A series of parameters, such as the physical dimensions of the flash tube, the gas pressure, the gas mixture and the composition of the electrodes is adapted in order, together with the operating voltage and capacities of the flash unit, to provide the optimal conditions for constant light characteristics within the dynamic range of the electron flash tube.

In a flash head system which comprises a flash generator, a flash head and possibly one or several extension cables it is advantageous if the flash head can be identified. This enables the flash generator to be able to adjust the output from the flash generator to the characteristics of the connected flash head.

As mentioned above the flash head is dimensioned to give an optimal light characteristic throughout its entire dynamic range. And parameters, such as the physical dimensions of the flash tube, the gas pressure, the gas mixture and the composition of the electrodes is adapted to provide the optimal light characteristics within the dynamic range of the electron flash tube. Thus it is advantage if the flash generator can identify which type of flash head that is connected to the flash generator and is able to adjust flash generator function to the connected flash head.

Previously known solutions in other applications are different types of data communication. Using data communication to identify flash heads adds complexity and cost to the flash heads and flash generators.

There is therefore a need for an improved solution for identifying flash heads, which solution solves or at least mitigates at least one of the above mentioned problems.

SUMMARY

It is understood by the inventor that it is highly desirable to provide a flash generator capable of identifying which type of flash head and flash head extension cables that is connected to the flash generator. It is also understood by the inventor that it is highly desirable to provide a flash head and flash head extension cable that can be identified by the flash generator.

This issue is addressed by a flash generator of providing a power supply to a flash head. The flash generator comprises a trigger wire power supply output and a capacitor for providing power to the trigger wire power supply output. Further the flash generator comprises a first current generator for charging the capacitor. The flash generator further comprises a second current generator or a voltage generator connected to an output of the flash generator and arranged to provide a current or a voltage to create a voltage $U_{ID}$ over a component in a flash head or a flash head extension cable connected to the flash generator. The flash generator also comprises a processing means arranged to measure the voltage $U_{ID}$ on the output. The processing means is further arranged to identify the flash head or the flash head extension cable by the measured voltage $U_{ID}$.

Since the flash generator further comprises a second current generator or a voltage generator connected to an output of the flash generator and arranged to provide a current or a voltage to create a voltage $U_{ID}$ over a component in a flash head or a flash head extension cable connected to the flash generator it is possible to identify a flash head or flash head extension cable connected to the output.

An advantage by the flash generator 10 being able to identify the connected flash head and possible extension cables is that the flash generator 10 can adjust the output power so that the flash heads maximum power not is exceeded.

Yet another advantage is that the flash generator 10 can adjust the output power to the flash head 20 and impedance of the extension cable 30 to achieve the correct light output energy.

According to another aspect, the disclosure presents a flash head connectable to a flash generator of providing a power supply to the flash head. The flash head comprises a connection for receiving power supply or signals from the flash generator. Further, a component is connected to the connection and arranged to, when a known current or voltage is supplied to the connection, the flash head can be identified via a voltage $U_{ID}$ created over the component.

According to yet another aspect, the disclosure presents a flash head extension cable connectable to a flash generator of providing a power supply to the flash head. The flash head extension cable comprises a connection for receiving power supply or signals from the flash generator. Further the flash head extension cable comprises a component connected to the connection. The component being arranged to when a known current or voltage being supplied to the connection, the flash head extension cable can be identified via a voltage $U_{ID}$ created over the component.

BRIEF DESCRIPTION OF THE DRAWINGS

The objects, advantages and effects as well as features of the invention will be more readily understood from the following detailed description of exemplary embodiments of the invention when read together with the accompanying drawings, in which.

DETAILED DESCRIPTION

Figure 1:
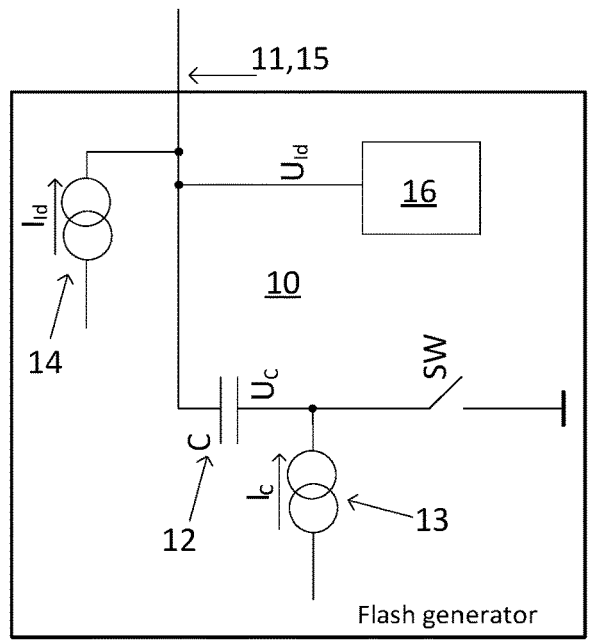
FIG. 1 illustrates a schematic block diagram of a flash generator of providing a power supply to a flash head according to an exemplary embodiment of the present disclosure.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 1 illustrates a flash generator 10 of providing a power supply to a flash head 20 according to an exemplary embodiment of the present disclosure. According to an aspect of the present disclosure the flash generator 10 can be used to power supply different types of flash heads 20. One type of flash head 20 that the flash generator 10 can be used to power is a ring flash. Another type of flash head 20 that the flash generator 10 can be used to power is a strip light. According to one aspect of the present disclosure the flash generator 10 is particularly advantageous for supplying power to different types of flash heads 20 since the flash generator 10 can identify different types of flash heads 20.

According to an aspect of the present disclosure the flash generator 10 comprises a trigger wire power supply output 11. The flash generator 10 further comprises a capacitor 12 for providing power to the trigger wire power supply output 11.

A first current generator 13 in the flash generator 10 is arranged for charging the capacitor 12. The flash generator further comprises a second current generator or a voltage generator 14 connected to an output 15 of the flash generator 10 and arranged to provide a current or a voltage to create a voltage $U_{ID}$ over a component in a flash head 20 or a flash head extension cable 30 connected to the flash generator 10. The flash generator 10 further comprises a processing means 16 arranged to measure the voltage $U_{ID}$ on the output 15. The processing means 16 being further arranged to identify the flash head 20 or the flash head extension cable 30 by the measured voltage $U_{ID}$.

By providing the flash generator 10 with a second current generator or a voltage generator 14 it is possible to create a voltage $U_{ID}$ over a component 22, 32 in a flash head 20 or a flash head extension cable 30 connected to the flash generator 10. And since the flash generator 10 also comprises processing means 16 arranged to measure the voltage $U_{ID}$ on the output 15 the flash head 20 or the flash head extension cable 30 can be identified by the processing means 16 by the measured voltage $U_{ID}$.

An advantage by the flash generator 10 being able to identify the connected flash head 20 and possible extension cables 30 is that the flash generator 10 can adjust the output power so that the flash heads 20 maximum power not is exceeded.

According to an aspect of the present disclosure the flash generator 10 has several outputs 15. In this aspect the flash generator 10 can comprise several second current generators or voltage generators 14 connected to the outputs 11, 15 and arranged to provide a current or a voltage to create a voltage $U_{ID}$ over a component in a flash heads or a flash head extension cables connected to the outputs 15. According to this aspect the processing means 16 is arranged to measure the voltage $U_{ID}$ on several outputs 11, 15. The processing means 16 is then arranged to identify the several the flash heads 20 or the flash head extension cables 30 connected to the outputs 11, 15.

Another advantage is that the flash generator 10 can adjust the output power to the flash head 20 and extension cable 30 impedance to get the right light energy at the one or more outputs 15. This is especially advantageous when using the flash generator 10 with several flash heads 20 connected to different outputs 15 of the flash generator 10. When using several flash heads 20, different numbers of extension cables 30 are often connected to the different outputs 15. This since the flash heads 20 often are positioned at different distances from the flash generator 10. By identifying the different flash heads 20 and extension cables 30 it is possible to adjust the output power to the different flash heads 20 and extension cables 30 impedance to get the right light energy from the several outputs 15. According to one aspect of the present disclosure the capacitor 12 is adapted so that the voltage created over the capacitor 12 when charged by the first current generator 13 is substantially higher than the voltage $U_{ID}$.

In another aspect of the present disclosure the processing means 16 is further arranged to identify the flash head 20 and several extension cables 30 connected in series by the unique voltage that is created over the serial connected components 22, 32 in the flash head 20 and several extension cables 30. This is possible since different components 22, 32 are chosen for different type's flash heads 20 and extension cables 30. Thus is a specific voltage drop created for each different type of flash head 20 or extension cable 30. If several extension cables 30 and a flash head 20 are connected in series, this creates a unique voltage drop. The processing means 16 can identify the different extension cables 30 and the flash head 20 that has created the unique voltage drop.

In yet another aspect of the present disclosure the output 11, 15 is the trigger wire power supply output 11, 15. In this aspect is thus the output 11, 15 combined with the trigger wire power supply output 11, 15. An advantage achieved by combining the output 11, 15 with the trigger wire supply output 11, 15 is that no extra output 11, 15 is required for being able to detect flash heads 20 and flash head extension cables 30 connected to the flash generator 10. In other words are the two functions trigger wire power supply output 11, 15 and output 11, 15 for identifying connected flash head 20 and extension cables 30 combined. This results in that fewer cables are required between the flash generator 10 and the flash head 20. Another advantage is that less connections on both the flash generator 10 and flash head 20 is also required.

Figure 2:
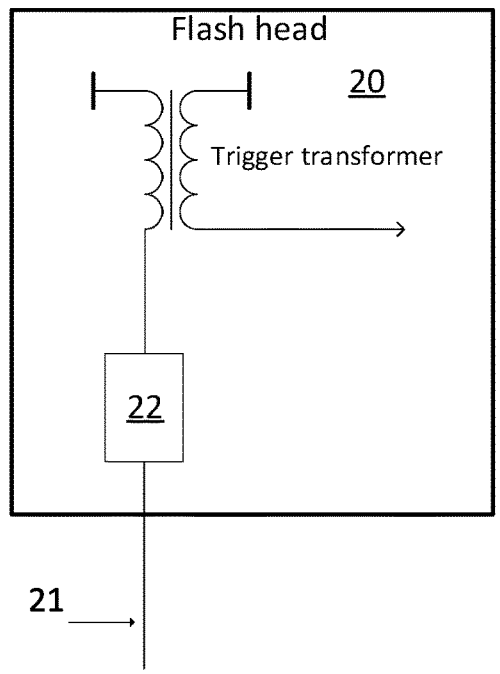
FIG. 2 illustrates a schematic block diagram of a flash head connectable to a flash generator of providing a power supply to the flash head.

FIG. 2 illustrates a flash head 20 connectable to a flash generator 10 of providing a power supply to the flash head 20. The flash head 20 comprises a connection 21 for receiving power supply or signals from the flash generator 10. Further, a component 22 is connected to the connection 21, the component 22 being arranged to when a known current or voltage is supplied to the connection 21 the flash head 20 can be identified via a voltage $U_{ID}$ created over the component 22.

According to an aspect of the present disclosure the component 22 in the flash head 20 is a passive component 22 or a combination of passive components 22. An advantage of using a passive component 22 or a combination of passive components 22 is that a passive component 22 is less complex than an active component. Passive components 22 are thus less likely to brake. Passive components 22 are also cheaper than active components.

According to an aspect of the present disclosure the component 22 is resistor 22. In this aspect the second current generator 14 generates a known current which creates a voltage drop over the resistor 22 in the flash head 20 or flash head extension cable 30. In an exemplary embodiment a zener diode (not shown) is connected in parallel over the resistor 22. An advantage with using a zener diode in parallel over the resistor 22 is that the zener diode starts to permit current to flow in the reverse direction at a certain voltage. The zener diode can thus prevent high currents from passing through the resistor 22 if the resistor 22 is placed in a wire that is used for other purposed than identifying connected flash heads 20 and flash head extension cables 30. According to one aspect the zener diode connected in parallel over the resistor 22 starts to lead when the voltage is above a voltage $U_d$, where $U_d$ is larger than $U_{id}$. According to one aspect wherein the zener diode being connected so that the zener diode allows current to flow in the direction of power supply to the flash head 20.

In another aspect of the present disclosure the component 22 is a zener diode. In this aspect the second voltage generator 14 generates a voltage which creates a voltage over the zener diode 22. At a certain voltage $U_{ID}$ the zener diode 22 in the flash head 20 or flash head extension cable 30 permits current to flow in the reverse direction. The flash head 20 or flash head extension cable 30 can then be identified via the voltage $U_{ID}$ required in order for the zener diode 22 to start to lead in the reverse direction.

According to an aspect of the present disclosure the flash head 20 is a ring flash or strip light.

In yet another aspect of the present disclosure the connection 21 for receiving power supply or signals is a trigger wire power supply input 21. In this aspect is thus the trigger wire power supply input 21 combined with connection used for identifying the flash head 20. An advantage achieved by combining the trigger wire power supply input 21 with the connection 21 used for identifying the flash head 20 is that no extra input is required for being able to identify the flash head 20. In other words are the two functions trigger wire power supply input 21 and input 21 for identifying the flash head 20 combined. This results in that fewer cables are required between the flash generator 10 and the flash head 20. Another advantage is that less connections on both the flash generator 10 and flash head 20 is also required.

Figure 3:
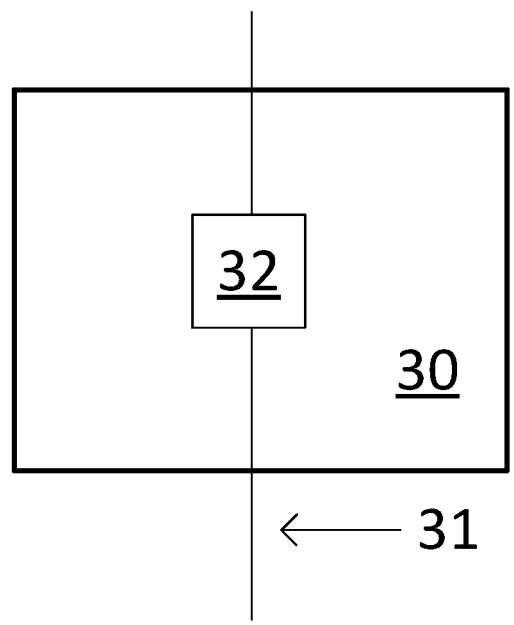
FIG. 3 illustrates a schematic block diagram of a flash head extension cable connectable to a flash generator of providing a power supply to the flash head.

FIG. 3 illustrates a flash head extension cable 30 connectable to a flash generator 10 of providing a power supply to the flash head 20. The flash head extension cable 30 comprises a connection 31 for receiving power supply or signals from the flash generator 10. Further the flash head extension cable 30 comprises a component 32 connected to the connection 31. The component 32 being arranged to when a known current or voltage being supplied to the connection 31, the flash head extension cable 30 can be identified via a voltage $U_{ID}$ created over the component 32.

According to an aspect of the present disclosure the component 32 in the flash head extension cable 30 is a passive component 32 or a combination of passive components 32. An advantage of using a passive component 32 or a combination of passive components 32 is that a passive component 32 is less complex than an active component. Passive components 32 are thus less likely to brake. Passive components 32 are also cheaper than active components.

According to an aspect of the present disclosure the component 32 in the flash head extension cable 30 is resistor.

In this aspect the second current generator 14 generates a known current which creates a voltage drop over the resistor 32 in the flash head extension cable 30. In an exemplary embodiment a zener diode is connected in parallel over the resistor 32. An advantage with using a zener diode in parallel over the resistor 32 is that the zener diode starts to permit current to flow in the reverse direction at a certain voltage. The zener diode can thus prevent high currents from passing through the resistor 32 if the resistor is placed in a wire that is used for other purposed than identifying a connected flash head extension cables. According to one aspect the zener diode connected in parallel over the resistor 32 starts to lead when the voltage is above a voltage $U_d$, where $U_d$ is larger than $U_{id}$. According to one aspect wherein the zener diode being connected so that the zener diode allows current to flow in the direction of power supply to the flash head extension cable 30.

In another aspect of the present disclosure the component 32 is a zener diode. In this aspect the second voltage generator 14 generates a voltage which creates a voltage over the zener diode 32. At a certain voltage $U_{ID}$ the zener diode 32 in the flash head extension cable 30 permits current to flow in the reverse direction. The flash head extension cable 30 can then be identified via the voltage $U_{ID}$ required in order for the zener diode 32 to start to lead in the reverse direction.

In yet another aspect of the present disclosure the connection 31 for receiving power supply or signals is a trigger wire power supply input 31. In this aspect is thus the trigger wire power supply input 31 combined with connection 31 used for identifying the flash head 20. An advantage achieved by combining the trigger wire power supply input 31 with the connection 31 used for identifying the flash head extension cable 30 is that no extra input is required for being able to identify the flash head extension cable 30. In other words are the two functions trigger wire power supply input 31 and input 31 for identifying the flash head extension cable 30 are combined. This results in that fewer cables are required between the flash generator 10 and the flash head extension cable 30. Another advantage is that less connections on both the flash generator 20 and flash head extension cable 30 is required.

The description above is of the best mode presently contemplated for practicing the present invention. The description is not intended to be taken in a limiting sense, but is made merely for the purpose of describing the general principles of the invention. The scope of the present invention should only be ascertained with reference to the issued claims.

What is claimed is:

1. A flash head connectable to a flash generator for providing a power supply to the flash head, the flash head comprising:
   a connection that receives power supply or signals from the flash generator; and
   a component connected to the connection, the component being arranged so that with a known current or voltage supplied to the connection, the flash head can be identified via a voltage $U_{ID}$ created over the component.

2. The flash head according to claim 1, wherein the component comprises a passive component or a combination of passive components.

3. The flash head according to claim 1, wherein the component comprises a resistor.

4. The flash head according to claim 1, wherein the component comprises a zener diode.

5. The flash head according to claim 3, wherein a zener diode is connected in parallel over the resistor.

6. The flash head according to claim 5, wherein the zener diode is connected so that the zener diode allows current to flow in the direction of power supply to the flash head.

7. The flash head according to claim 6, wherein the zener diode also permits current to flow in the reverse direction with the voltage above a voltage $U_d$, where $U_d$ is larger than $U_{id}$.

8. The flash head according to claim 1, wherein the flash head comprises a ring flash or strip light.

9. The flash head according to claim 1, wherein the connection is configured to receive a trigger signal to the flash head.

10. A flash head extension cable connectable to a flash generator for providing a power supply to the flash head, the flash head extension cable comprising:
a connection that receives power supply or signals from the flash generator; and
a component connected to the connection, the component being arranged so that with a known current or voltage supplied to the connection, the flash head extension cable can be identified via a voltage $U_{ID}$ created over the component.

11. The flash head extension cable according to claim 10, wherein the component comprises a passive component or a combination of passive components.

12. The flash head extension cable according to claim 10, wherein the component comprises a resistor.

13. The flash head extension cable according to claim 10, wherein the component comprises a zener diode.

14. The flash head extension cable according to claim 12, wherein a zener diode is connected in parallel over the resistor.

15. The flash head extension cable according to claim 14, wherein the zener diode is connected to allow current to flow in the direction of power supply to the flash head.

16. The flash head extension cable according to claim 14, wherein the zener diode also permits current to flow in the reverse direction with the voltage above a voltage $U_d$, where $U_d$ is larger than $U_{id}$.

17. A flash generator for providing a power supply to a flash head, the flash generator comprising:
trigger wire power supply output;
a capacitor that provides power to the trigger wire power supply output;
a first current generator that charges the capacitor;
a second current generator or a voltage generator connected to an output of the flash generator and arranged to provide a current or a voltage to create a voltage $U_{ID}$ over a component in a flash head or a flash head extension cable connected to the flash generator; and
a processing circuit that measures the voltage $U_{ID}$ on the output and identifies the flash head or the flash head extension cable by the measured voltage $U_{ID}$.

18. The flash generator according to claim 17, wherein the capacitor is adapted so that the voltage created over the capacitor with charge by the first current generator is substantially higher than the voltage $U_{ID}$.

19. The flash generator according to claim 17, wherein the processing circuit is further arranged to identify a flash head and one or more extension cables connected in series by the unique voltage that is created over the serial connected components in the flash head and one or more extension cables.

20. The flash generator according to claim 17, wherein the output is the trigger wire power supply output.

* * * * *